United States Patent Office 3,344,522
Patented Oct. 3, 1967

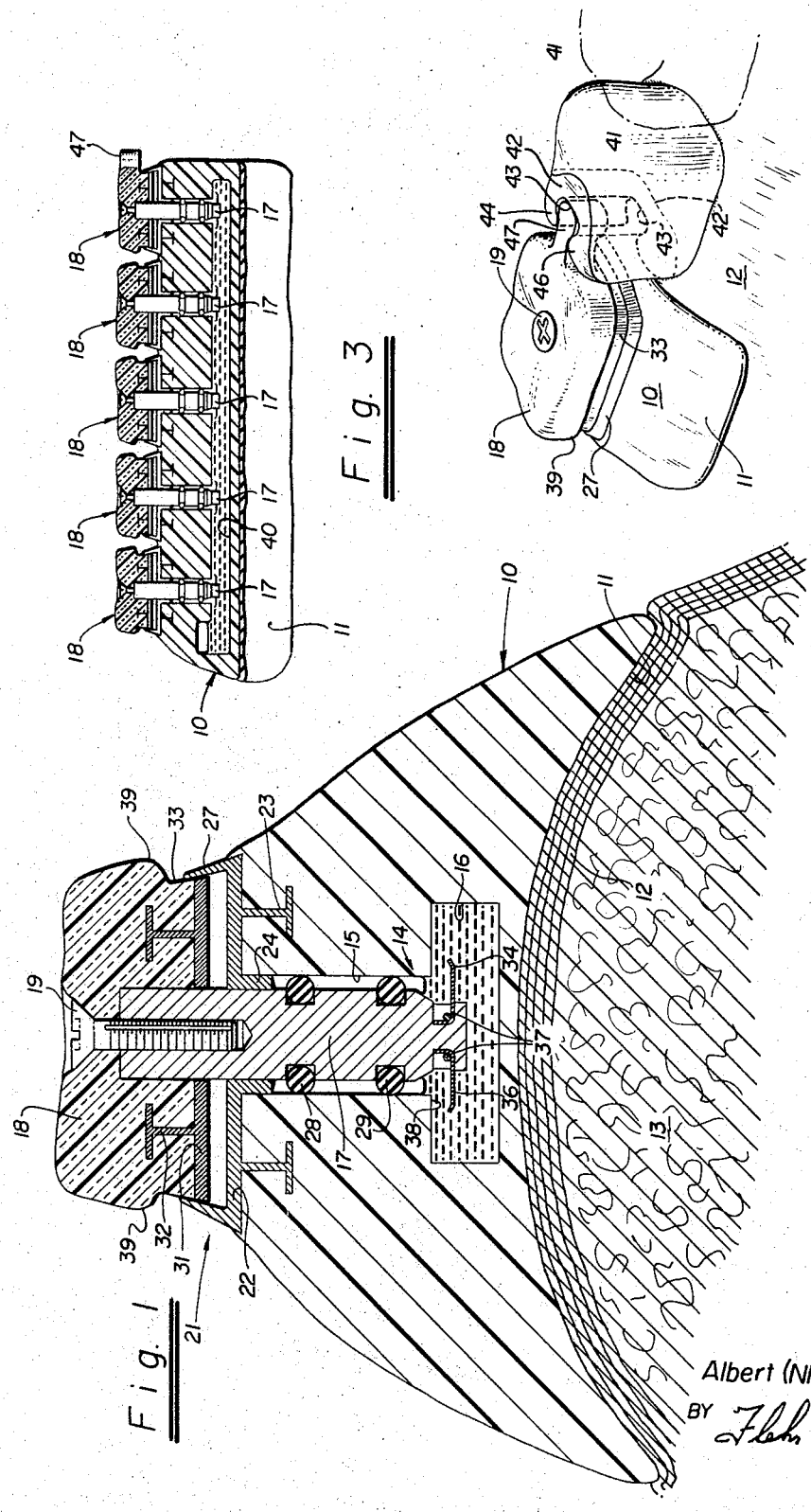

3,344,522
ARTIFICIAL DENTURE
Albert Wasserman, 410 N. San Mateo Drive,
San Mateo, Calif. 94401
Filed Nov. 23, 1964, Ser. No. 413,273
9 Claims. (Cl. 32—6)

ABSTRACT OF THE DISCLOSURE

An artificial denture with stress relieving means including a closed chamber in the base of the denture containing a compressible fluid. An artificial tooth supported by a plunger means disposed for reciprocable movement within the chamber to transmit pressure applied to the tooth to the walls of the chamber.

---

The present invention relates to artificial dentures, and more particularly to prosthetic dental devices having means for relief of localized stress in the mouth of the wearer of a prosthetic dental piece.

In the past, a wide variety of spring devices have been employed to absorb the stresses generated by mastication of food and otherwise but with limited satisfaction. These have taken the form of coil springs, leaf springs, soft plastic cushions, etc.

It is a general object of the invention to provide an improved stress-relieving denture.

It is another object of this invention to employ a fluid to absorb the localized stresses applied to the dental ridge by an artificial tooth during mastication.

It is a further object of this invention to mount an artificial tooth for substantially natural movement in a denture.

It is a further object of this invention to mount an artificial tooth adjustably in a denture to compensate for changes in the dental ridge (gum and bone) of the wearer.

It is still another object of this invention to minimize the transmission of forces adjacent natural teeth from an artificial denture.

It is also an object of this invention to provide a comfortable, long-lasting artificial denture.

These and other objects will become apparent from the following detailed description of a preferred embodiment of the invention when considered in conjunction with the drawings in which:

FIGURE 1 is an enlarged transverse section showing a dental piece according to the invention;

FIGURE 2 is a perspective view of the dental piece of FIGURE 1; and

FIGURE 3 shows another embodiment of a dental piece employing a plurality of artificial teeth according to the invention.

Generally speaking, the invention involves the use of fluid means to relieve localized stresses developed in the reciprocating movement of artificial dentures during mastication. When only a partial denture is required, the stress on an adjacent natural tooth is alleviated by use of the present construction.

By way of background, a natural tooth is not rigidly fixed in the mouth. Rather, the natural tooth moves in its socket by means of periodontal fibers, which are elastic, so as to accommodate the stresses developed during chewing. Artificial dentures are often mounted with little elasticity whereby stresses are transmitted directly to the bone structure resulting in bone resorption and destruction.

The present invention permits the artificial tooth to be supported in a body of fluid, whereby localized pressures are relieved by being more widely and evenly distributed along that surface of the denture in contact with the gum, with little stress developed on adjacent supporting natural teeth.

As shown in the drawings, my artificial denture comprises a denture base 10 formed with a saddle 11 which is adapted to fit or the gum 12. Gum 12 overlies the bone 13 of the user's jaw. The denture base 10 is preferably formed of one of the usual plastic materials, such as methyl methacrylate. Base 10 includes a stress distribution chamber 14 which conveniently takes the shape of a cylinder 15 leading into an enlarged reservoir 16 at one end thereof. Reservoir 16 is relatively large to provide a comparable relatively large interior surface capable of distributing fluid forces over a rather extensive surface.

Compressible fluid means has been provided within chamber 14 for resiliently resisting inward movement of a plunger into the chamber and for yieldingly urging the plunger outwardly thereof. The plunger carries an artificial tooth of the denture and is supported for reciprocal movement during chewing, clenching or otherwise.

Cylinder 15 and reservoir 16 contain the compressible fluid means preferably in the form of a body of liquid and a body of gas. Glycerine and air provide a particularly desirable fluid functioning inasmuch as the glycerine serves to add a modest damping viscosity which, when taken with the compressible gas, approximates the action of the periodontal fibers normally serving natural teeth. The volume of liquid can be adjusted with respect to the volume of gas to develop just the right amount of resiliency to the tooth movement, as desired.

A tooth assembly, as now to be described, is arranged for reciprocal plunging movement into and out of the compressible fluid means whereby the compressible fluid means serves to support the tooth for masticating movement in an approximation of support by periodontal fibers.

A piston 17 is disposed within cylinder 15, and in contact with the fluid. Piston 17 is disposed to move within chamber 14 so that the fluid yieldingly retards the movement of the piston and transmits localized stresses to the relatively large interior wall surface of chamber 14 thereby absorbing stresses imparted to the piston by the artificial tooth 18 mounted on the end thereof.

Suitable means are employed to attach tooth 18 to piston 17. As illustrated, screw 19 passes through tooth 18 and engages piston 17, permitting tooth 18 to be readily detachable for easy replacement with a tooth of a different shade, or to replace a damaged tooth, or for cleaning and repair, etc.

Tooth 18 is carried in a seat member 21 formed to be anchored securely to base 10. Thus seat member 21 includes a flat base 22 provided with anchoring studs 23 embedded in the material of denture base 10. Seat member 21 further includes an annular sleeve 24 disposed to fit within cylinder 15 and aid in guiding piston 17 and in sealing the fluid within chamber 14.

The underside of tooth 18 is provided with a plate 31 anchored to tooth 18 by studs 32 embedded into the material of the tooth. The lower periphery 33 of tooth 18 provides a slightly conical surface formed to fit within a metal rim 27 formed on seat member 21. Rim 27 extends radially slightly inwardly to form a socket for the lower periphery 33 of tooth 18 and to overhang periphery 33 slightly so as to engage same and prevent entry of food beneath tooth 18.

Means are employed to maintain fluid sealed within cylinder 15, to guide piston 17, and to accommodate modest lateral grinding movement of tooth 18. Thus, a pair of longitudinally spaced O-rings 28, 29 surround piston 17 and engage the inner surface of cylinder 15.

Means are employed to insure retention of tooth 18. In the drawing, at the inner end of piston 17, leaf springs 34 and 36 are pivotally carried loosely by pins 37 at one end and are adapted to engage the shoulder 38 formed between reservoir 16 and cylinder 15. When first inserted, the leaf springs 34, 36 are folded against piston 17 to pass through cylinder 15. When reservoir 16 is reached, the springs snap outwardly to the position shown. When extended, the springs positively prevent removal of piston 17 (and its attached tooth 18) from cylinder 15 by any forces normally encountered. Springs 34, 36 can, however, be bent backwards during repair so as to withdraw piston 17.

The distance between tooth 18 and base 10 may be variously adjusted to accommodate individuals with different pressure habits and to take into account changes in the gum structure. For example, bruxism or clenching of the teeth results in increased pressure on the tooth structure, which, in time, can result in damage to the tooth, the underlying saddle region, or to the gum and bone structure of the wearer. Moreover, the gum tends to shrink with the passage of time, necessitating "relining" the denture to add new material to maintain the proper vertical dimension. These difficulties are avoided in my construction by occasionally changing the length of the piston employed and, consequently, the space between the top of tooth 18 and the saddle 11.

To promote ease of maintenance, it is preferred to provide means to prevent impaction of the food in the space between tooth 18 and seat member 21. A bulging contour or convexity 39 to the sides of tooth 18 is provided in order to deflect food particles into vestibular areas. In addition, rim 27, as mentioned above, extends over the base edge of tooth 18.

From the foregoing it will be readily evident that an artificial tooth assembly has been provided for reciprocal and lateral movement approximating the normal movements of a natural tooth in its socket.

A plurality of such artificial teeth are arranged in the embodiment shown in FIGURE 3 to cooperate with a common chamber 40 which is otherwise comparable to chamber 14.

The usual partial plate includes a saddle formed to engage the dental ridge (gum and underlying bone structure) of the wearer and is further secured to a natural tooth. The natural tooth takes severe stresses imparted to some extent by forces of chewing, etc. developed at all of the teeth in the partial plate. As now to be described, however, according to the present construction the natural anchoring tooth receives a minimum of stress from the artificial teeth. Further, the present construction comes close to achieving the ideal condition wherein the partial plate is merely resting upon the gum and held in place by the adhesion of natural fluids in the mouth existing between the saddle and gum.

Thus, means are provided to secure a partial plate or other artificial denture device to a natural tooth whereby transmission of stress to the natural tooth is minimized and which permits the denture piece to ride upon and move with the gum. In general a hinged coupling is formed for slidable engagement accommodating movement of the artificial tooth in a direction generally parallel to the plunging movement thereof.

As shown in FIGURE 2, the denture base 10 is disposed upon gum 12 adjacent a natural tooth 41. Base 10 carries artificial tooth 18 and rim 27 as described above. A crown 42 is mounted on tooth 41. Crown 42 has a groove 43 formed between protrusions 44, 46. A tongue member 47 is formed as part of tooth 18. Tongue 47 is adapted to fit within groove 43 and to slidably, though loosely, engage the inner surfaces of protrusions 44, 46.

The foregoing tongue and groove arrangement serves as a hinge to permit tooth 18 to swing laterally to a certain extent with relation to natural tooth 41. The tongue and groove arrangement also permits a certain degree of relative longitudinal movement between natural tooth 41 and artificial tooth 18 by allowing tongue 47 to easily slide within the groove.

Tongue 47 is shorter than the length of groove 43. This permits a greater amount of longitudinal relative movement between tooth 18 and natural tooth 41. The tongue and groove arrangement permits a sliding action of the tongue within the groove as well as lateral sideways movement, reducing the amount of stress transmitted to the natural tooth. The means illustrated permits the denture to stay in place on the ridge of the jaw bone with a minimum amount of sliding on gum 12.

The hinge-like action of the tongue and groove arrangement permits lateral movement of the artificial tooth in the chewing of food without danger of dislodging the denture from its natural position on the wearer's ridge.

It is thus apparent that the artificial denture of my invention permits a degree of natural movement in all directions approaching that of a natural tooth. The tooth floats yieldingly on a piston in a fluid-containing cylinder, widely distributing the stresses developed during mastication or otherwise. Lateral movement of the artificial tooth is permitted not only by the resilient O-rings but also by the hinge-like action of the tongue and groove attachment to natural teeth. By broadly distributing the stresses developed, the dental ridges are preserved, and a comfortable, long lasting denture is assured. Changes, such as gum resorption, can be readily compensated by readily removing piston 17 and substituting one of greater length. Finally, the air pocket within chamber 14 can be variously increased or decreased by changing the volume of liquid so as to impart a more desirable resilience to the tooth.

I claim:

1. In an artificial denture, means forming a denture base, said base including a saddle portion adapted to mount on the gum of the wearer, a closed chamber defined in said base for containing compressible fluid means therein of a type comprised partly of liquid, a tooth assembly including an artificial tooth and plunger means supporting said tooth, said plunger means being disposed for reciprocal movements within said chamber responsive to masticating movement of said tooth, said plunger being disposed to be in communication with fluid in said chamber whereby pressures applied to said tooth become transmitted via said plunger and fluid to the walls of said chamber.

2. Denture apparatus according to claim 1 further including compressible fluid means within said chamber, said fluid means comprising a body of damping liquid and a volume of gas.

3. In an artificial denture, means forming a denture base, said base including a saddle portion adapted to mount on the gum of the wearer, a closed chamber defined in said base for containing compressible fluid means therein, a tooth assembly including an artificial tooth and plunger means supporting said tooth, said plunger means being disposed for reciprocal movements within said chamber responsive to masticating movement of said tooth, said plunger being disposed to be in communication with fluid in said chamber whereby pressures applied to said tooth become transmitted via said plunger and fluid to the walls of said chamber and resilient means engaging said plunger means in guiding relation thereto within said chamber, said resilient means being disposed to yieldingly absorb lateral movement of said tooth-supporting plunger.

4. In an artificial denture, a denture base formed to include a saddle adapted to mount on the gum, a closed chamber in said base containing a fluid comprised of liquid and gas, a piston adapted to travel in said chamber to yieldingly compress the fluid in said chamber, an artificial tooth mounted on said piston and disposed outside said chamber adjacent said base, and means to prevent food impaction between said tooth and said base.

5. An artificial denture as in claim 4 wherein the last named means comprises the sides of said artificial tooth formed sufficiently convex to deflect food particles into vestibular areas, and a rim encircling the base end of the tooth in closely adjacent relation, said rim extending away from said denture base and supported thereon.

6. In an artificial denture adapted to be secured to a natural tooth, said denture comprising a denture base including a saddle portion adapted to mount on the gum of the wearer, a closed chamber defined in said base for containing compressible fluid means therein comprised partly of liquid, plunger means disposed for reciprocal movements within said chamber responsive to masticating movement of said tooth, said plunger being disposed to be in communication with fluid in said chamber to yieldingly compress fluid in the chamber, an artificial tooth supported by said plunger and movable therewith, and means forming a hinged coupling between said artificial tooth and said natural tooth, the axis of said hinged coupling being disposed in generally parallel relation to the axis of the natural tooth, said hinged coupling further being formed to permit relative movement between said natural and artificial teeth in a direction substantially along the first named axis.

7. In an artificial denture adapted to be secured to a natural tooth, said denture comprising a denture base including a saddle portion adapted to mount on the gum of the wearer, a plurality of artificial teeth independently and resiliently movable in a direction into and out of said denture base, and means forming a hinged coupling between one of said artificial teeth and said natural tooth, the axis of said hinged coupling being generally parallel to the direction of movement of said artificial teeth into and out of said base, said hinged coupling being further formed to permit relative movement between the natural and said one of the artificial teeth in a direction generally parallel to the first named direction.

8. Denture apparatus according to claim 6 wherein said hinged coupling includes a crown adapted to be placed on said natural tooth, a groove formed on said crown and adapted to extend toward the gum of the wearer, and a tongue member carried by said artificial tooth and dimensioned to be slidably engaged in said groove, said tongue member extending along said groove but terminating sufficiently short of the gum end thereof to accommodate the plunging movements of said artificial tooth.

9. Denture apparatus according to claim 7 wherein said hinged coupling includes a crown adapted to be placed on said natural tooth, a groove formed on said crown and adapted to extend toward the gum of the wearer, and a tongue member carried by said artificial tooth and dimensioned to be slidably engaged in said groove, said tongue member extending along said groove but terminating sufficiently short of the gum end thereof to accommodate the plunging movements of said artificial tooth.

References Cited
UNITED STATES PATENTS

| | | | |
|---|---|---|---|
| 1,324,476 | 12/1919 | Supplee | 32—5 |
| 2,574,810 | 11/1951 | Baumgardner | 32—2 |

RICHARD A. GAUDET, *Primary Examiner.*

ROBERT E. MORGAN, *Assistant Examiner.*